United States Patent
Chen et al.

(10) Patent No.: US 12,416,579 B1
(45) Date of Patent: Sep. 16, 2025

(54) MISALIGNMENT DETECTION METHOD AND APPARATUS FOR BATTERY TABS, AND BATTERY ELECTRODE PLATE WINDING SYSTEM

(71) Applicant: CONTEMPORARY AMPEREX TECHNOLOGY CO., LIMITED, Ningde (CN)

(72) Inventors: Zhipeng Chen, Ningde (CN); Chao Chen, Ningde (CN); Wenjun Xue, Ningde (CN); Tao Feng, Ningde (CN); Lin Ma, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/206,073

(22) Filed: May 13, 2025

Related U.S. Application Data (63) Continuation of application No. PCT/CN2024/097772, filed on Jun. 6, 2024.

(30) Foreign Application Priority Data

Mar. 12, 2024 (CN) .................. 202410276704.5

(51) Int. Cl.
*G01N 21/88* (2006.01)
*G01B 11/14* (2006.01)
*H01M 10/04* (2006.01)

(52) U.S. Cl.
CPC ......... *G01N 21/8851* (2013.01); *G01B 11/14* (2013.01); *H01M 10/0431* (2013.01); *G01N 2021/889* (2013.01)

(58) Field of Classification Search
CPC ......... G01N 21/8851; G01N 2021/889; G01B 11/14; H01M 10/0431
See application file for complete search history.

(56) References Cited

U.S. PATENT DOCUMENTS

| | | | |
|---|---|---|---|
| 12,355,027 B2 * | 7/2025 | Zhang | B65H 75/2484 |
| 2005/0123824 A1 * | 6/2005 | Ishikawa | H01M 10/0587 429/185 |

(Continued)

FOREIGN PATENT DOCUMENTS

| | | |
|---|---|---|
| CN | 207705343 U | 8/2018 |
| CN | 109585902 A | 4/2019 |

(Continued)

OTHER PUBLICATIONS

International Search Report of PCT Application No. PCT/CN2024/097772, mailed Jul. 30, 2024, 6 pages with English translation.

(Continued)

*Primary Examiner* — Xuemei G Chen
(74) *Attorney, Agent, or Firm* — K&L Gates LLP (57) ABSTRACT

A misalignment detection method and apparatus for battery tabs, and a battery electrode plate winding system, are disclosed. The method includes winding a battery electrode plate onto a winding shaft. For an Nth layer (where N is an integer greater than zero) of the electrode plate section wound on the winding shaft, an image including a battery tab region is acquired during the winding period. A relative positional relationship between a battery tab and a reference part on the winding shaft is determined from the image. Based on this positional relationship and the layer number of the Nth electrode plate section, a misalignment amount of the battery tab is calculated for when the wound electrode plate is later pressed into a battery cell. The method enables (Continued)

real-time monitoring of tab alignment during winding, improving accuracy in battery cell assembly.

9 Claims, 5 Drawing Sheets

(56) References Cited

U.S. PATENT DOCUMENTS

| | | | |
|---|---|---|---|
| 2023/0109550 A1* | 4/2023 | Chen | G03B 17/12 |
| | | | 348/95 |
| 2023/0246249 A1* | 8/2023 | Chen | H01M 10/0525 |
| 2023/0314124 A1* | 10/2023 | Wang | G01B 11/022 |
| | | | 702/150 |
| 2024/0003822 A1* | 1/2024 | Tu | H01M 4/04 |
| 2024/0039031 A1* | 2/2024 | Chen | H01M 10/0431 |
| 2024/0077432 A1* | 3/2024 | Tu | G06T 7/0004 |
| 2024/0094146 A1* | 3/2024 | Zhang | G01N 23/04 |
| 2024/0177287 A1* | 5/2024 | Wang | G06T 7/0004 |
| 2024/0311993 A1* | 9/2024 | Zhao | G06V 10/44 |
| 2024/0320857 A1* | 9/2024 | Chen | H01M 10/0413 |
| 2024/0363889 A1* | 10/2024 | Chai | H01M 10/0587 |
| 2025/0070215 A1* | 2/2025 | Lee | H01M 50/538 |

FOREIGN PATENT DOCUMENTS

| | | | | |
|---|---|---|---|---|
| CN | 111584923 A | * | 8/2020 | G01B 11/00 |
| CN | 112310568 A | * | 2/2021 | H01M 10/0587 |
| CN | 113097570 A | | 7/2021 | |
| CN | 113591308 A | | 11/2021 | |
| CN | 113594556 A | | 11/2021 | |
| CN | 116998041 A | | 11/2023 | |
| CN | 117374418 A | | 1/2024 | |
| CN | 117541592 A | | 2/2024 | |
| CN | 117870547 A | | 4/2024 | |
| EP | 2187466 A1 | | 5/2010 | |
| WO | 2023160175 A1 | | 8/2023 | |

OTHER PUBLICATIONS

ISA Written Opinion of PCT Application No. PCT/CN2024/097772, mailed Jul. 30, 2024, 10 pages with English translation.
The first Office Action received in the counterpart Chinese Application 2024102767045, mailed Apr. 15, 2024, 18 pages with English translation.
The Grant Notice received in the counterpart Chinese Application 2024102767045, mailed May 9, 2024, 9 pages with English translation.

* cited by examiner

MISALIGNMENT DETECTION METHOD AND APPARATUS FOR BATTERY TABS, AND BATTERY ELECTRODE PLATE WINDING SYSTEM

CROSS-REFERENCE TO RELATED APPLICATIONS

The present application is a continuation of International Application No. PCT/CN2024/097772, filed on Jun. 6, 2024, which claims priority to Chinese Patent Application No. 202410276704.5, filed with the China National Intellectual Property Administration on Mar. 12, 2024 and entitled "MISALIGNMENT DETECTION METHOD AND APPARATUS FOR BATTERY TABS, AND BATTERY ELECTRODE PLATE WINDING SYSTEM", which is incorporated herein by reference in its entirety.

TECHNICAL FIELD

The present application relates to the technical field of battery manufacturing, and in particular, to a misalignment detection method and apparatus for battery tabs, and a battery electrode plate winding system.

BACKGROUND

Energy conservation and emission reduction are the key to the sustainable development of the automobile industry. Electric vehicles, with their advantages of energy conservation and environmental protection, have emerged as an important component for the sustainable development in the automobile industry. For the electric vehicles, battery technology is also an important factor about their development.

Lithium batteries can be classified into cylindrical batteries, prismatic batteries, pouch batteries, and the like according to their forms. Production processes of different types of lithium batteries have some differences. However, generally speaking, the production process of the lithium batteries may be divided into an early-stage process (manufacturing electrode plates), a middle-stage process (synthesizing a battery cell), and a later-stage process (forming and encapsulating). In the early-stage process, both positive electrode plates and negative electrode plates can be processed and manufactured. In the middle-stage process, the battery cell can be manufactured. There are some differences between the middle-stage processes of the different types of lithium batteries. Because energy storage structures of the prismatic (in a roll shape), cylindrical (in a roll shape), and pouch (in a layered shape) batteries are different, there is a clear difference in embodiments of the different types of lithium batteries in the middle-stage process. Specifically, the main procedure of the middle-stage process of the prismatic and cylindrical batteries includes: winding, liquid injecting, encapsulating, and the like. The main procedure of the middle-stage process of the pouch battery includes: laminating, liquid injecting, encapsulating, and the like. The winding process refers to winding the electrode plates into the battery cell of the lithium battery, which is mainly used for producing prismatic and cylindrical lithium batteries. In the winding process, positive and negative electrode plates and a separator may be sequentially wound into a cylindrical or prismatic battery cell by using a winding machine. The winding machine may be subdivided into two types: a prismatic winding machine and a cylindrical winding machine, which are used for producing the prismatic lithium batteries and the cylindrical lithium batteries, respectively.

The state of battery tabs of the wound battery cell has an important impact on the product quality of the wound battery cell. The defective state of misalignment of the battery tab may occur when the wound battery cell is pressed into the prismatic battery cell. The compressive deformation may cause misalignment between different electrode plate sections, resulting in misalignment of the battery tab. Because winding and pressing are two different processes, if misalignment of the battery tab is only detected after the pressing process, multiple electrode plates may have been wound in the winding process, and all these wound electrode plates may have the defective state of misalignment of the battery tab. Therefore, it is needed to reduce the production of wound battery cells with misaligned battery tabs.

The methods described in this part are not necessarily methods that have been conceived or adopted previously. Unless otherwise indicated, it should not be assumed that any method described in this part is considered as the prior art merely because it is included in this part. Similarly, unless otherwise indicated, the problems mentioned in this part should not be considered to be have been generally accepted in any prior art.

SUMMARY

To reduce the production of wound battery cells with misaligned battery tabs, the present application provides a misalignment detection method and apparatus for battery tabs, and a battery electrode plate winding system.

An example of a first aspect of the present application provides a misalignment detection method for battery tabs, including: using a winding shaft to wind a battery electrode plate; for an $N^{th}$ (N is an integer greater than 0) layer of an electrode plate section wound on the winding shaft: obtaining, in a winding period, an image to be tested of the layer of the electrode plate section, where the image to be tested includes a battery tab region; determining a relative positional relationship, between a battery tab and a reference part on the winding shaft, in the image to be tested; and determining, according to the relative positional relationship and a layer number of the $N^{th}$ layer of the electrode plate section on the winding shaft, a misalignment amount of the battery tab when the wound electrode plate is pressed into a battery cell, including: determining, according to the layer number of the $N^{th}$ layer of the electrode plate section on the winding shaft and a thickness of each layer of the electrode plate, an accumulated thickness from a first layer of the electrode plate section to the $N^{th}$ layer of the electrode plate section, where a sum of the following two parts is determined as the misalignment amount: a relative distance, between the battery tab and the reference part on the winding shaft, in the image to be tested; and a product of a radius of a semicircular end region of the battery cell when the wound electrode plate is pressed into the battery cell and $(1-\pi/2)$, where $\pi$ is a circular constant, and a value of the radius is a value of the accumulated thickness.

In the technical solution of the example of the present application, by the layer number of each layer of the electrode plate section on the winding shaft and the determined relative positional relationship, between the battery tab and the reference part, in the image of the layer of the electrode plate section, which are acquired in the electrode plate winding period, the misalignment amount of the battery tab when the wound electrode plate is pressed into the battery cell can be determined before the wound electrode plate is pressed. Therefore, the misalignment amount of the battery tab can be predicted before a pressing process, so as to accurately recognize the defective state of the battery tab in the wound battery cell as soon as possible, to prevent a defective battery cell from flowing into a next process. In addition, the production of more wound battery cells with misaligned battery tabs can be reduced or avoided.

In some examples, the obtaining, in a winding period, an image to be tested of the layer of the electrode plate section, includes: using, in the winding period, a line scan camera to capture multiple continuous image rows of the layer of the electrode plate section, where each image row extends in a direction parallel to an axis of the winding shaft; and sequentially stitching the multiple continuous image rows to obtain the image to be tested. The line scan camera is used to capture the multiple continuous image rows of each layer of the electrode plate section in the winding period, and the image rows captured by the line scan camera are stitched, so that image data of the electrode plate section with a higher resolution and a larger range can be obtained, thereby better meeting a requirement of capturing an image of the electrode plate section with a rotational motion in the winding period.

In some examples, the above-mentioned method may further include: obtaining a total thickness and a total number of layers of the wound electrode plate, and the determining, according to the relative positional relationship and a layer number of the $N^{th}$ layer of the electrode plate section on the winding shaft, a misalignment amount of the battery tab when the wound electrode plate is pressed into a battery cell includes: determining, according to the total thickness and the total number of layers, the accumulated thickness from the first layer of the electrode plate section to the $N^{th}$ layer of the electrode plate section; and determining, according to the accumulated thickness and the relative positional relationship, the misalignment amount of the battery tab in the $N^{th}$ layer of the electrode plate section when the wound electrode plate is pressed into the battery cell. The accumulated thickness from the first layer of the electrode plate section to the $N^{th}$ layer of the electrode plate section is determined according to the total thickness and the total number of layers of the wound electrode plate, so as to further determine the misalignment amount. Compared with that the accumulated thickness from the first layer of the electrode plate section to the $N^{th}$ layer of the electrode plate section is determined according to a thickness of each layer of the electrode plate section, so as to further determine the misalignment amount, more accumulated thicknesses that are determined are more accurate, so that calculation of the misalignment amount is more accurate.

In some examples, the winding shaft includes a slot configured to remove the winding shaft from the wound electrode plate, and the reference part is a position of the slot. The slot configured to remove the winding shaft from the wound electrode plate is used as the reference part on the winding shaft, that is, an existing part on the winding shaft is used as the reference part, so that there is no need to dispose an additional reference part on the shaft, without increasing the construction complexity of an apparatus.

In some examples, the determining a relative positional relationship, between a battery tab and a reference part on the winding shaft, in the image to be tested includes: determining, in a direction perpendicular to the axis of the winding shaft, a distance, between an end of the battery tab and an end of the slot, in the image to be tested and using the distance as the relative positional relationship. By calculating the distance, between the end of the battery tab and the end of the slot, in the image to be tested in the direction perpendicular to the axis of the winding shaft, the misalignment amount of the battery tab can be quickly and accurately determined when the wound electrode plate is pressed into the battery cell, thereby further improving the accuracy and efficiency for detecting misalignment of the battery tab.

In some examples, the determining a relative positional relationship, between a battery tab and a reference part on the winding shaft, in the image to be tested includes: respectively determining, based on pixel values of multiple pixels included in the image to be tested, a position of the battery tab and a position of the reference part from the image to be tested; and determining, according to the position of the battery tab and the position of the reference part, the relative positional relationship. Therefore, the position of the battery tab and the position of the reference part can be efficiently determined, and then the relative positional relationship between the battery tab and the reference part can be efficiently determined.

In some examples, the winding shaft is configured to wind, according to a control instruction, the battery electrode plate, and the layer number of the $N^{th}$ layer of the electrode plate section on the winding shaft is determined through the following process: determining, according to the control instruction, an accumulated rotation angle of the winding shaft; and determining, according to the accumulated rotation angle, the layer number of the $N^{th}$ layer of the electrode plate section on the winding shaft, including: for every 360-degree rotation, determining that the layer number of the electrode plate section is increased by one. Therefore, by determining, based on the rotation control instruction, the layer number of the $N^{th}$ layer of the electrode plate section on the winding shaft, the layer number can be conveniently and accurately determined.

In some examples, the above-mentioned method may further include: during obtaining the image to be tested, using a line light source to irradiate the electrode plate section wound on the winding shaft. Therefore, image quality of the obtained image to be tested can be improved, thereby further improving an effect of recognizing misalignment of the battery tab.

An example of a second aspect of the present application provides a misalignment detection apparatus for battery tabs, including: a winding shaft control module, configured to control a winding shaft to wind a battery electrode plate; and a misalignment detection module, the misalignment detection module including an image obtaining unit, a position determining unit, and a misalignment amount determining unit. For an $N^{th}$ (N is an integer greater than 0) layer of an electrode plate section wound on the winding shaft: the image obtaining unit is configured to obtain, in a winding period, an image to be tested of the layer of the electrode plate section, where the image to be tested includes a battery tab region; the position determining unit is configured to determine a relative positional relationship, between a battery tab and a reference part on the winding shaft, in the image to be tested; and the misalignment amount determining unit is configured to determine, according to the relative positional relationship and a layer number of the $N^{th}$ layer of the electrode plate section on the winding shaft, a misalignment amount of the battery tab when the wound electrode plate is pressed into a battery cell, including: determining, according to the layer number of the $N^{th}$ layer of the electrode plate section on the winding shaft and a thickness of each layer of the electrode plate, an accumulated thickness from a first layer of the electrode plate section to the $N^{th}$ layer of the electrode plate section, where a sum of the following two parts is determined as the misalignment amount: a relative distance, between the battery tab and the reference part on the winding shaft, in the image to be tested; and a product of a radius of a semi-circular end region of the battery cell when the wound electrode plate is pressed into the battery cell and $(1-\pi/2)$, where $\pi$ is a circular constant, and a value of the radius is a value of the accumulated thickness.

An example of a third aspect of the present application provides a battery electrode plate winding system, including: a winding machine, the winding machine including a winding shaft configured to wind a battery electrode plate; a camera, configured to capture an image to be tested of an electrode plate section wound on the winding shaft; and an upper computer, the upper computer being configured to perform a method in the above-mentioned example.

The above-mentioned description is only a summary of the technical solutions of the present application. In order to be able to understand the technical means of the present application more clearly, the technical means can be implemented according to the content of the specification. Furthermore, to make the above-mentioned and other objectives, features and advantages of the present application more comprehensible, specific embodiments of the present application are exemplified below.

BRIEF DESCRIPTION OF THE DRAWINGS

In the drawings, unless otherwise specified, same reference numerals throughout multiple drawings represent same or similar parts or elements. These drawings are not necessarily drawn to scale. It should be understood that these drawings only describe some embodiments disclosed according to the present application, and should not be construed as limitations to the scope of the present application.

DETAILED DESCRIPTION

The examples of the technical solutions of the present application will be described in detail below with reference to the accompanying drawings. The following examples are only used to illustrate the technical solutions of the present application more explicitly, and are thus only interpreted as examples, rather than used to limit the protection scope of the present application.

Unless otherwise defined, meanings of all technical and scientific terms used herein are the same as those usually understood by a person skilled in the art to which the present application belongs. Terms used herein are merely intended to describe objectives of the specific examples, and are not intended to limit the present application. The terms "include", "have", and any variant thereof in the specification and claims of the present application and the above-mentioned drawings are intended to cover a non-exclusive inclusion.

In the description of the examples of the present application, the technical terms "first", "second", and the like are used only to distinguish different objects, and should not be understood as indicating or implying relative importance or implying the number, specific order or primary and secondary relationship of indicated technical features. In the description of the examples of the present application, the meaning of "multiple" is two or more, unless otherwise explicitly and specifically defined.

Reference herein to an "example" means that a particular feature, structure, or characteristic described in connection with the example can be included in at least one example of the present application. The phrases appearing at different positions of the specification may not always refer to the same example or an independent or alternative example that is mutually exclusive with other examples. A person skilled in the art explicitly or implicitly understands that the examples described herein may be combined with other examples.

In the description of the examples of the present application, the term "and/or" merely describes an association relationship of associated objects and represents that three relationships may exist, for example, A and/or B may represent the following three cases: only A exists, both A and B exist, and only B exists. In addition, the character "/" in this specification generally indicates an "or" relationship between the associated objects.

In the description of the examples of the present application, the term "multiple" means two or more (including two). Similarly, "multiple groups" means two or more groups (including two groups), and "multiple pieces" means two or more pieces (including two pieces).

In the description of the examples of the present application, the orientation or positional relationship indicated by the technical terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are the orientation or positional relationship shown on the basis of the drawings and are intended to facilitate describing the examples of the present application and simplify the description only, rather than indicating or implying that the apparatus or element referred to must have a particular orientation or be constructed and operated in a particular orientation, and therefore are not to be interpreted as limitations on the examples of the present application.

In the description of the examples of the present application, unless otherwise explicitly specified or defined, the technical terms such as "mount", "connect", "connected", and "fix" should be understood in a broad sense. For example, the connection may be a fixed connection, a detachable connection, or an integral connection; or the connection may be a mechanical connection or an electrical connection; or the connection may be a direct connection, an indirect connection through an intermediate medium, internal communication between two components, or an interaction relationship between two components. For a person of ordinary skill in the art, the specific meanings of the above-mentioned terms in the examples of the present application may be interpreted according to specific situations.

Nowadays, from the perspective of development of the market situation, power batteries are applied increasingly. The power batteries are not only used in energy storage power systems such as water power plants, fire power plants, wind power plants and solar power plants, but also in electric transportations such as electric bicycles, electric motorcycles, and electric vehicles, as well as in military equipment, aerospace and other fields. With continuous expansion of the application fields of the power batteries, market demands for the power batteries are also expanding.

As described above, in a battery manufacturing process, a winding process may be used for producing prismatic and cylindrical lithium batteries. In the winding process, positive and negative electrode plates and a separator may be sequentially wound into a cylindrical or prismatic battery cell by using a winding machine. The state of battery tabs of the wound battery cell has an important impact on the product quality of the wound battery cell. Common defective states of the battery tab include: misalignment of the battery tab, folding of the battery tab, breakage of the battery tab, absence of the battery tab, and the like. These defective states affect assembly and performances of the wound battery cell to some extent. For example, the folding of the battery tab may cause a failure of a short circuit test of the wound battery cell. When the battery tab is misaligned seriously, a process abnormality such as an insufficient area of a welding mark may be caused during assembling and welding of a battery. Reduction of the defective states of the battery tab generated in the winding process is a problem that we need to pay attention to in the current battery production process. Therefore, it is needed to be able to effectively recognize the defective state of the battery tab in the wound battery cell, so as to prevent a defective battery cell from flowing into a next process.

The defective state of misalignment of the battery tab may occur in a winding period, or may occur when the wound battery cell is pressed (for example, pressed into a cylindrical or prismatic battery cell) after winding ends. In some cases, the defect of misalignment of the battery tab does not occur in the winding period. However, when the wound battery cell is pressed into the prismatic battery cell, the compressive deformation may cause misalignment between different electrode plate sections, resulting in misalignment of the battery tab. Because winding and pressing are two different processes, if misalignment of the battery tab is only detected after the pressing process, multiple electrode plates may have been wound in the winding process, and all these wound electrode plates may have the defective state of misalignment of the battery tab.

In view of this, examples of the present application provide a misalignment detection method and apparatus for battery tabs, a computing device, a battery electrode plate winding system, a computer-readable storage medium, and a computer program product. By a layer number of each layer of an electrode plate section on a winding shaft and a determined relative positional relationship, between a battery tab and a reference part, in an image of the layer of the electrode plate section, which are acquired in an electrode plate winding period, a misalignment amount of the battery tab when the wound electrode plate is pressed into a battery cell can be determined before the wound electrode plate is pressed. Therefore, the misalignment amount of the battery tab can be predicted before a pressing process, so as to accurately recognize the defective state of the battery tab in the wound battery cell as soon as possible, to prevent a defective battery cell from flowing into a next process. In addition, the production of more wound battery cells with misaligned battery tabs can be reduced or avoided.

The misalignment detection method for battery tabs disclosed in the example of the present application may be used for detecting, but is not limited to detecting a battery of a vehicle, a ship, an aircraft, or the like. In this way, efficiency and accuracy for detecting an abnormal battery are improved, so that labor costs are reduced.

Figure 1:
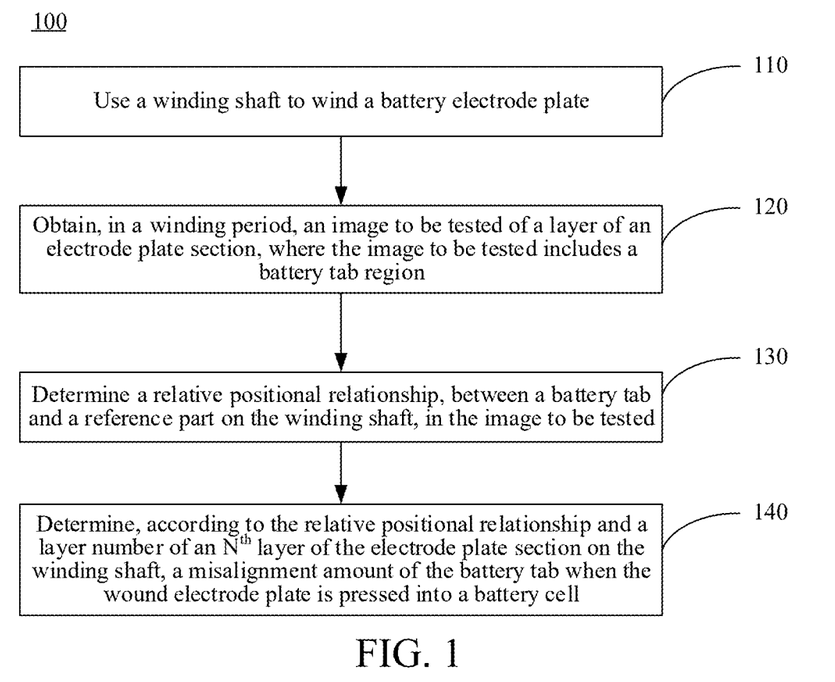
FIG. 1 is a schematic flowchart of a misalignment detection method for battery tabs according to some examples of the present application.

An example of the present application provides a misalignment detection method for battery tabs. FIG. 1 is a schematic flowchart of a misalignment detection method 100 for battery tabs according to some examples of the present application. As shown in FIG. 1, the misalignment detection method 100 for battery tabs includes:

step 110: use a winding shaft to wind a battery electrode plate; and perform step 120 to step 140 for an $N^{th}$ (N is an integer greater than 0) layer of an electrode plate section wound on the winding shaft.

Step 120: obtain, in a winding period, an image to be tested of the layer of the electrode plate section, where the image to be tested includes a battery tab region;

step 130: determine a relative positional relationship, between a battery tab and a reference part on the winding shaft, in the image to be tested; and step 140: determine, according to the relative positional relationship and a layer number of the $N^{th}$ layer of the electrode plate section on the winding shaft, a misalignment amount of the battery tab when the wound electrode plate is pressed into a battery cell.

The winding shaft may be configured to wind a positive electrode plate or a negative electrode plate. The winding shaft may be in a form of a winding needle. A shaft body of the winding shaft may be made of a wear-resistant material, and the shaft body needs to be capable of withstanding a tension in a winding process, and needs to have certain rigidity and stability. In addition, to improve the wear resistance and the corrosion resistance of the winding shaft, a surface of the shaft body may be subjected to coating treatment, such as chrome plating or plastic spraying. In addition, an associated control system and a driving apparatus may be provided to control and drive rotation of the winding shaft.

Multiple layers of the electrode plate section wound on the winding shaft may be continuous. For example, in the winding process, a first layer of the electrode plate section is first wound on the winding shaft, next, a second layer of the electrode plate section is wound onto the first layer of the electrode plate section, and then, a third layer of the electrode plate section is wound onto the second layer of the electrode plate section. The rest can be deduced by analogy. In an example, a total number of layers of the wound electrode plate may be preset.

Figure 2:
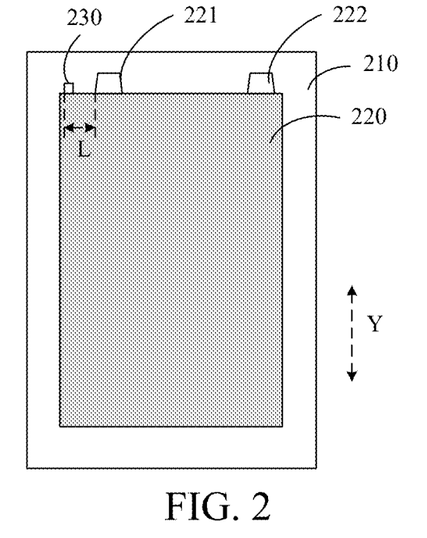
FIG. 2 is a schematic diagram of an image to be tested acquired when the misalignment detection method for battery tabs according to some examples of the present application is used for performing detection.
Figure 3:
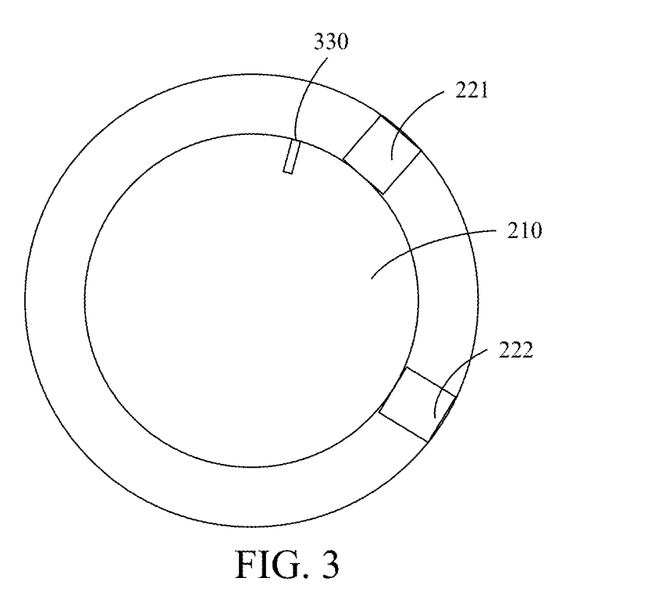
FIG. 3 is a schematic diagram of a wound electrode plate when the misalignment detection method for battery tabs is performed according to some examples of the present application.
Figure 4:
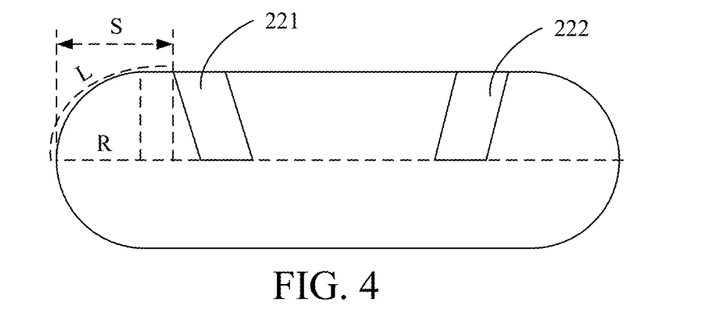
FIG. 4 is a schematic diagram of determining, by using the misalignment detection method for battery tabs according to some examples of the present application, a misalignment amount of the battery tab when the wound electrode plate is pressed into a battery cell.

The following continues to refer to FIG. 2 to FIG. 4. FIG. 2 is a schematic diagram of the image to be tested acquired when the misalignment detection method for battery tabs according to some examples of the present application is used for performing detection. FIG. 3 is a schematic diagram of the wound electrode plate when the misalignment detection method for battery tabs is performed according to some examples of the present application; and FIG. 4 is a schematic diagram of determining, by using the misalignment detection method for battery tabs according to some examples of the present application, the misalignment amount of the battery tab when the wound electrode plate is pressed into the battery cell.

In step 120, obtain, in the winding period, the image to be tested of the $N^{th}$ (N is an integer greater than 0) layer of the electrode plate section. For example, a camera (a camera or a video camera) may be used for photographing the electrode plate section. The camera may be provided at a position close to the winding shaft and a distance between the winding shaft and the camera is set to enable the entire winding shaft to be displayed within a field of view of the camera. The control system may be used to control the camera to capture the image to be tested. The image to be tested may include a battery electrode plate body region and a winding shaft background region adjacent to the battery electrode plate body region (that is, the winding shaft is used as a background of a battery body region). The battery tab region and the reference part on the winding shaft may both be located in the winding shaft background region.

For example, as shown in FIG. 2, FIG. 2 shows the image to be tested of the $N^{th}$ layer of the electrode plate section. The image to be tested may include a winding shaft 210, an electrode plate body 220, an anode tab 221, a cathode tab 222, and a reference part 230.

In step 130, determine the relative positional relationship, between the battery tab and the reference part on the winding shaft, in the image to be tested. The reference part on the winding shaft may be a part predisposed on the winding shaft. For example, the reference part may be a colored mark on the winding shaft, or a pattern (such as a two-dimensional code) drawn on the winding shaft, or a component (such as a screw) on the winding shaft as long as a relative position between the reference part and the winding shaft does not change in the winding process. The relative positional relationship, between the battery tab and the reference part on the winding shaft, in the image to be tested may include a distance between the battery tab and the reference part on the winding shaft (for example, a linear distance between the battery tab and the reference part on the winding shaft).

For example, as shown in FIG. 2, a distance L, between the anode tab 221 and the reference part 230 on the winding shaft, in the image to be tested may be determined and used as a relative positional relationship between the anode tab 221 and the reference part 230 on the winding shaft. It should be understood that, for the cathode tab, a distance between the cathode tab and the reference part 230 on the winding shaft may be used as a relative positional relationship between the cathode tab and the reference part 230 on the winding shaft.

After the electrode plate is completely wound, as shown in FIG. 3 (a top view of the wound electrode plate together with the winding shaft), it can be seen from a position above the wound electrode plate that the wound multi-layer electrode plate is located on a periphery of the winding shaft 210, and the anode tab 221 of each layer of the electrode plate is aligned as much as possible (the multi-layer anode tab 221 is stacked in a rectangular shape), and the cathode tab 222 of each layer of the electrode plate is aligned as much as possible (the multi-layer cathode tab 222 is stacked in a rectangular shape). However, when the wound electrode plate needs to be pressed to obtain, for example, a prismatic battery cell, the aligned anode tab 221 or cathode tab 222 may be misaligned (as shown in FIG. 4).

In step 140, determine, according to the relative positional relationship and the layer number of the $N^{th}$ layer of the electrode plate section on the winding shaft, the misalignment amount of the battery tab when the wound electrode plate is pressed into the battery cell.

For example, it can be seen from FIG. 4 (a top view of the wound electrode plate after being pressed) that, when the wound electrode plate is pressed, the whole wound electrode plate is pressed from a cylindrical shape to a relatively flat shape. In this process, both the multi-layer aligned anode tab 221 and the multi-layer aligned cathode tab 222 may be misaligned (the multi-layer anode tab 221 is misaligned into a parallelogram like shape, and the multi-layer cathode tab 222 is misaligned into a parallelogram like shape). However, before and after the pressing process, the layer number of the wound electrode plate remains unchanged. After the positional relationship (for example, the distance between the anode tab and the reference part on the winding shaft, or the distance between the cathode tab and the reference part on the winding shaft) is determined, and the layer number of the current $N^{th}$ layer of the electrode plate section on the winding shaft is determined, the misalignment amount of the battery tab when the wound electrode plate is pressed into the battery cell can be determined. FIG. 4 shows a misalignment amount S of the anode tab 221 when the wound electrode plate is pressed into the battery cell. In an example in FIG. 4, a current accumulated thickness from the first layer of the electrode plate section to the $N^{th}$ layer of the electrode plate section may be determined as N*d according to the layer number of the current $N^{th}$ layer of the electrode plate section on the winding shaft and a thickness d of each layer of the electrode plate. That is, a radius R in FIG. 4 is a radius of a semi-circular end region of the battery cell when the wound electrode plate is pressed into the battery cell, where R=N*d. The misalignment amount S≈R+[L−(π*R)/2], where π is a circular constant, and (π*R)/2 is a quarter of a perimeter of a circle using R as a radius.

In an example, a difference of the misalignment amount of the $N^{th}$ layer of the electrode plate section relative to the first layer of the electrode plate section may be determined.

In an example, in response to determining that the misalignment amount of the electrode plate section exceeds a threshold, a warning indication is issued, and different thresholds may be set according to different electrode plate parameters.

In addition, in an example, a rotation counter may be used to calculate an angle by which a rotation shaft rotates, so as to determine a number of layers of winding.

Therefore, by the layer number of each layer of the electrode plate section on the winding shaft and the determined relative positional relationship, between the battery tab and the reference part, in the image of the layer of the electrode plate section, which are acquired in the electrode plate winding period, the misalignment amount of the battery tab when the wound electrode plate is pressed into the battery cell can be determined before the wound electrode plate is pressed. Therefore, the misalignment amount of the battery tab can be predicted before a pressing process, so as to accurately recognize the defective state of the battery tab in the wound battery cell as soon as possible, to prevent a defective battery cell from flowing into a next process. In addition, the production of more wound battery cells with misaligned battery tabs can be reduced or avoided. In addition, because the misalignment amount of the battery tab is determined by considering a thickness of the electrode plate (for the electrode plate section in different layers, corresponding calculated misalignment amounts are different), the misalignment amount of each layer of the battery tab can be more accurately determined when the wound electrode plate is pressed into the battery cell.

Figure 5:
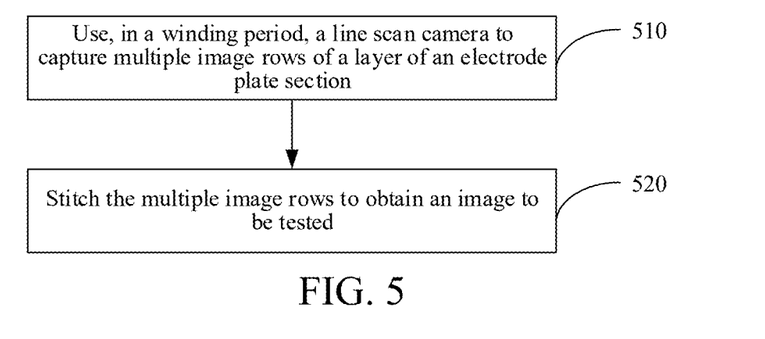
FIG. 5 is a schematic flowchart of some processes of the misalignment detection method for battery tabs according to some examples of the present application.

FIG. 5 is a schematic flowchart of some processes of the misalignment detection method for battery tabs according to some examples of the present application.

According to some examples of the present application, as shown in FIG. 5, the above-mentioned step 120: obtain, in a winding period, an image to be tested of the layer of the electrode plate section may include:

step 510: use, in the winding period, a line scan camera to capture multiple continuous image rows of the layer of the electrode plate section, where each image row extends in a direction parallel to an axis of the winding shaft; and step 520: sequentially stitch the multiple continuous image rows to obtain the image to be tested.

The line scan camera is also referred to as a line array camera, may be used in an occasion in which there is a relative motion between a measured object and the camera, and is characterized in that, like scanning, the camera and the photographed object move at a relative constant speed during photographing. An imaging principle of the line scan camera is using single-row sensor pixels (an effective value is in one dimension) to construct a two-dimensional image, and a second dimension is from a motion of an imaged object. When the object moves (vertically) to pass through pixel lines in an image sensor, the two-dimensional image is acquired row by row by continuous single-row scanning. Compared with an area array camera, the line scan camera can obtain a higher resolution and a larger field of view for image acquisition.

One-dimensional image data is obtained after the line scan camera is used to capture multiple continuous image rows of the layer of the electrode plate section. Next, the acquired one-dimensional image data may be stitched to form the two-dimensional image. In an example, the stitched image may have a certain overlapping region to facilitate improving stitching accuracy. In addition, illumination compensation may be performed on images in different illumination conditions to improve quality of the stitched image. In an example, a corresponding motion compensation algorithm may be used to stitch patterns of the electrode plate section in a motion, so as to improve stability of the stitched image.

In an example, the image to be tested shown in FIG. 2 may be formed by stitching the multiple continuous image rows, acquired by the line scan camera, of the $N^{th}$ layer of the electrode plate section. Each image row may extend in a direction of an arrow Y in FIG. 2.

The line scan camera is used to capture the multiple continuous image rows of each layer of the electrode plate section in the winding period, and the image rows captured by the line scan camera are stitched, so that image data of the electrode plate section with a higher resolution and a larger range can be obtained, thereby better meeting a requirement of capturing an image of the electrode plate section with a rotational motion in the winding period.

In an example, real-time stitching and real-time image detection may further be performed on the image rows captured by the line scan camera. In response to detecting that the reference part and the anode tab or the cathode tab adjacent to the reference part already exist in the stitched image, the relative positional relationship between the reference part and the anode tab or the cathode tab is determined, and subsequent image rows of the layer of the electrode plate section do not continue to be stitched, thereby reducing consumption of computational power.

Figure 6:
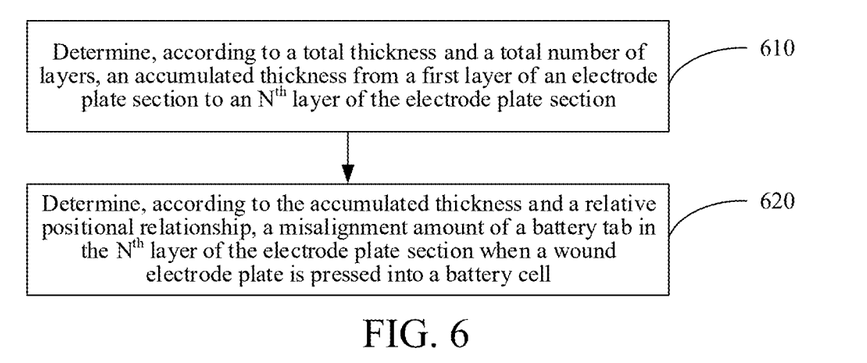
FIG. 6 is another schematic flowchart of some processes of the misalignment detection method for battery tabs according to some examples of the present application.

FIG. 6 is a schematic flowchart of some processes of the misalignment detection method for battery tabs according to some examples of the present application.

According to some examples of the present application, the misalignment detection method 100 for battery tabs may further include: obtain a total thickness and a total number of layers of the wound electrode plate, and the above-mentioned step 140: determine, according to the relative positional relationship and a layer number of the $N^{th}$ layer of the electrode plate section on the winding shaft, a misalignment amount of the battery tab when the wound electrode plate is pressed into a battery cell, includes:

step 610: determine according to the total thickness and the total number of layers, the accumulated thickness from the first layer of the electrode plate section to the $N^{th}$ layer of the electrode plate section; and step 620: determine, according to the accumulated thickness and the relative positional relationship, the misalignment amount of the battery tab in the $N^{th}$ layer of the electrode plate section when the wound electrode plate is pressed into the battery cell.

In an example, the total thickness of the wound electrode plate may be predetermined before winding (for example, a normal total thickness is obtained). Alternatively, measurement may be performed at any position of the wound electrode plate by using a thickness measurement meter after the winding ends.

In step 610, the accumulated thickness from the first layer of the electrode plate section to the $N^{th}$ layer of the electrode plate section is $R=(D/X)*N$, where D is the total thickness of the wound electrode plate. X (X is an integer greater than 0, and is not less than N) is the total number of layers of the wound electrode plate, namely, the radius $R=(D/X)*N$ in FIG. 4.

Correspondingly, in step 620, determine, according to the accumulated thickness and the relative positional relationship, the misalignment amount of the battery tab in the $N^{th}$ layer of the electrode plate section when the wound electrode plate is pressed into the battery cell, where the misalignment amount $S \approx R+[L-(\pi*R)/2]=L+[(D/X)*N]*[1-(\pi/2)]$.

The accumulated thickness from the first layer of the electrode plate section to the $N^{th}$ layer of the electrode plate section is determined according to the total thickness and the total number of layers of the wound electrode plate, so as to further determine the misalignment amount. Compared with that the accumulated thickness from the first layer of the electrode plate section to the $N^{th}$ layer of the electrode plate section is determined according to a thickness of each layer of the electrode plate section, so as to further determine the misalignment amount, more accumulated thicknesses that are determined are more accurate, so that calculation of the misalignment amount is more accurate.

According to some examples of the present application, the winding shaft may include a slot configured to remove the winding shaft from the wound electrode plate, and the above-mentioned reference part is a position of the slot.

After the electrode plate is completely wound, and before the wound electrode plate is pressed, the winding shaft usually needs to be removed from the wound electrode plate. The slot (for example, a needle withdrawing slot) may be provide in the winding shaft (for example, a winding needle), and the winding shaft can be pulled out from the wound electrode plate manually or by inserting a tool into the slot. In an example, the slot may be disposed at any end of the winding shaft, or may be disposed at two ends of the winding shaft.

In an example, there may be multiple slots at any end of the winding shaft. For example, as shown in FIG. 3, the winding shaft may have only one slot 330 or two slots at one end thereof, and the two slots may be arranged at an interval of 180 degrees.

The slot configured to remove the winding shaft from the wound electrode plate is used as the reference part on the winding shaft, that is, an existing part on the winding shaft is used as the reference part, so that there is no need to dispose an additional reference part on the shaft, without increasing the construction complexity of an apparatus.

According to some examples of the present application, the above-mentioned step 130: determine a relative positional relationship, between a battery tab and a reference part on the winding shaft, in the image to be tested may include: determine, in a direction perpendicular to the axis of the winding shaft, a distance, between an end of the battery tab and an end of the slot, in the image to be tested and use the distance as the relative positional relationship.

Further referring to FIG. 2, the direction perpendicular to the axis of the winding shaft may be perpendicular to a direction indicated by a Y direction in FIG. 2. In an example, a distance (such as the distance L shown in FIG. 2), between a left end of the anode tab 221 and a left end of the slot (the reference part 230), in the image to be tested may be determined in the direction perpendicular to the axis of the winding shaft. Alternatively, a distance, between a right end of the anode tab 221 and a right end of the slot (the reference part 230), in the image to be tested may be determined. In addition, a distance, between a left end of the cathode tab 222 and the left end of the slot (the reference part 230), in the image to be tested may also be determined. Alternatively, a distance, between a right end of the cathode tab 222 and the right end of the slot (the reference part 230), in the image to be tested may be determined.

By calculating the distance, between the end of the battery tab and the end of the slot, in the image to be tested in the direction perpendicular to the axis of the winding shaft, the misalignment amount of the battery tab can be quickly and accurately determined when the wound electrode plate is pressed into the battery cell, thereby further improving the accuracy and efficiency for detecting misalignment of the battery tab.

Figure 7:
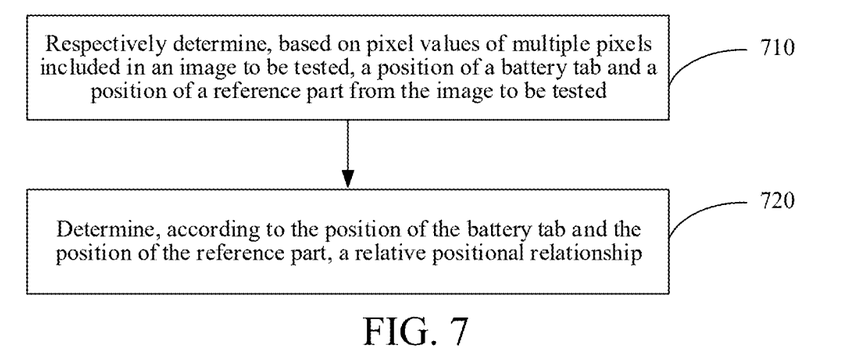
FIG. 7 is another schematic flowchart of some processes of the misalignment detection method for battery tabs according to some examples of the present application.

FIG. 7 is another schematic flowchart of some processes of the misalignment detection method 100 for battery tabs according to some examples of the present application.

According to some examples of the present application, as shown in FIG. 7, the above step 130: determine a relative positional relationship, between a battery tab and a reference part on the winding shaft, in the image to be tested may include:

step 710: respectively determine, based on pixel values of multiple pixels included in the image to be tested, a position of the battery tab and a position of the reference part from the image to be tested; and step 720: determine, according to the position of the battery tab and the position of the reference part, the relative positional relationship.

In an example, the image to be tested may be a grayscale image, or may be a color image. Different regions in the image to be tested have different grayscale values. For example, the battery electrode plate body region and the winding shaft background region have different pixel values (grayscale values). For example, a grayscale threshold is set, and the grayscale threshold may be used to classify the pixels of the image to be tested into two categories: foreground (electrode plate body region) and background (winding shaft background region). A grayscale value of each pixel of the image to be tested is compared with a selected threshold. If the grayscale value of the pixel is less than or equal to the threshold, the pixel may be marked as the foreground; otherwise, the pixel is marked as the background. Further, in the winding shaft background region, grayscale values of the battery tab region and the reference part are both different from the grayscale value of the winding shaft background region, and the battery tab region and the reference part can be further determined from the winding shaft background region by using grayscale value differences therebetween.

In an example, the above-mentioned different grayscale thresholds may be determined by using an Otsu algorithm. The main idea of the algorithm is to divide, according to grayscale features of the image, the image into two parts: a background and a target, and the division is based on the selected threshold so as to make a variance between the background and the target maximum. In this way, a probability of wrong division can be minimized.

In an example, the determined relative positional relationship between the two parts may be a distance between the two parts (for example, a distance between the two parts in the direction perpendicular to the axis of the winding shaft).

Therefore, the position of the battery tab and the position of the reference part can be efficiently determined, and then the relative positional relationship between the battery tab and the reference part can be efficiently determined.

Figure 8:
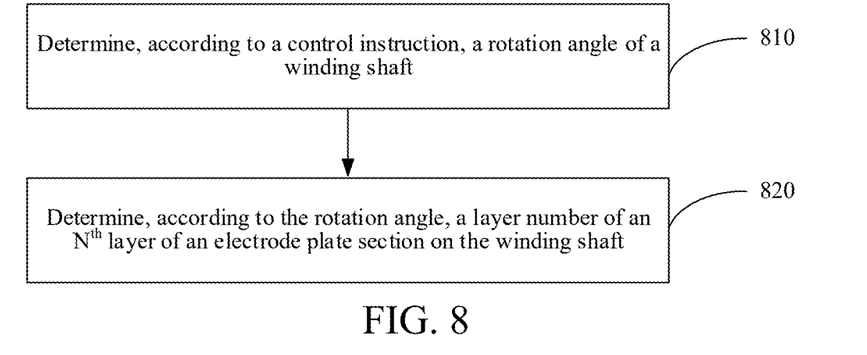
FIG. 8 is another schematic flowchart of some processes of the misalignment detection method for battery tabs according to some examples of the present application.

FIG. 8 is another schematic flowchart of some processes of the misalignment detection method 100 for battery tabs according to some examples of the present application.

According to some examples of the present application, as shown in FIG. 8, the winding shaft is configured to wind, according to a control instruction, the battery electrode plate, and the layer number of the $N^{th}$ layer of the electrode plate section on the winding shaft is determined through the following process:

step 810: determine, according to the control instruction, an accumulated rotation angle of the winding shaft; and step 820: determine, according to the accumulated rotation angle, the layer number of the $N^{th}$ layer of the electrode plate section on the winding shaft.

In an example, the control instruction may be sent by a control system. The control system may be, for example, a programmable logic controller. The programmable logic controller may control an execution mechanism (for example, a motor) to drive the winding shaft to rotate. Therefore, the rotation control instruction may be directly obtained from the programmable logic controller, so as to determine the accumulated rotation angle of the winding shaft. Determine, according to the accumulated rotation angle, the layer number of the $N^{th}$ layer of the electrode plate section on the winding shaft, for example, for every 360- degree rotation, determine that the layer number of the electrode plate section is increased by one.

Therefore, by determining, based on the rotation control instruction, the layer number of the $N^{th}$ layer of the electrode plate section on the winding shaft, the layer number can be conveniently and accurately determined.

According to some examples of the present application, the misalignment detection method 100 for battery tabs may further include: during obtaining the image to be tested, use a line light source to irradiate the electrode plate section wound on the winding shaft.

For example, the line light source may be used for providing illumination for the corresponding line scan camera. In an example, the line light source may be disposed adjacent to the winding shaft, to form a narrow-strip bright band. In addition, the line light source may be disposed parallel to the line scan camera, so that the line scan camera can obtain better capturing quality. A specific type of the line light source is not limited, and the line light source may be, for example, an LED light source, a halogen lamp, or a high-frequency fluorescent lamp or the like.

Therefore, image quality of the obtained image to be tested can be improved, thereby further improving an effect of recognizing misalignment of the battery tab.

Figure 9:
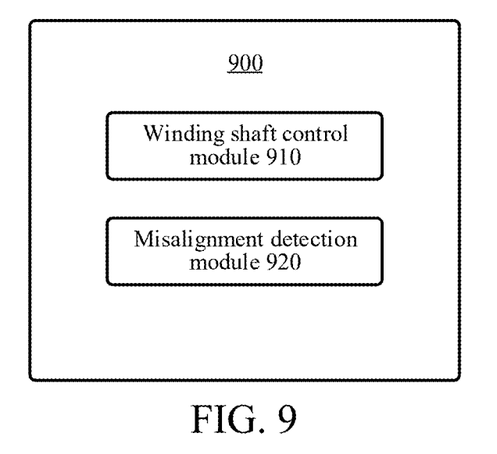
FIG. 9 is a schematic block diagram of a misalignment detection apparatus for battery tabs according to some examples of the present application.

An example of the present application provides a misalignment detection apparatus for battery tabs. FIG. 9 is a schematic block diagram of a misalignment detection apparatus 900 for battery tabs according to some examples of the present application.

Referring to FIG. 9, the misalignment detection apparatus 900 for battery tabs includes: a winding shaft control module 910 and a misalignment detection module 920. The misalignment detection module 920 includes an image obtaining unit, a position determining unit, and a misalignment amount determining unit. The winding shaft control module 910 is configured to control a winding shaft to wind a battery electrode plate.

For an $N^{th}$ (N is an integer greater than 0) layer of an electrode plate section wound on the winding shaft:
  the image obtaining unit is configured to obtain, in a winding period, an image to be tested of the layer of the electrode plate section, where the image to be tested includes a battery tab region;
  the position determining unit is configured to determine a relative positional relationship, between a battery tab and a reference part on the winding shaft, in the image to be tested; and
  the misalignment amount determining unit is configured to determine, according to the relative positional relationship and a layer number of the $N^{th}$ layer of the electrode plate section on the winding shaft, a misalignment amount of the battery tab when the wound electrode plate is pressed into a battery cell.

The winding shaft control module 910 in the misalignment detection apparatus 900 for battery tabs may correspond to step 110 in the misalignment detection method 100 for battery tabs shown in FIG. 1, and the misalignment detection module 920 in the misalignment detection apparatus 900 for battery tabs may correspond to steps 120-140 in the misalignment detection method 100 for battery tabs shown in FIG. 1. Details are not described herein again for brevity. It should be understood that, corresponding to the examples of the misalignment detection method 100 for battery tabs, examples of the misalignment detection apparatus 900 for battery tabs may further include more modules.

It should be noted that each module discussed herein may be divided into multiple modules according to functions, and/or at least some of multiple modules may be combined into a single module according to functions. That a particular module performs an action discussed herein includes that the particular module itself performs the action, or alternatively, the particular module invokes or otherwise accesses another assembly or module that performs the action (or performing the action in combination with the particular module). Therefore, the particular module performing the action may include the particular module itself performing the action and/or another module that is invoked or otherwise accessed by the particular module and performs the action.

It should be further understood that various technologies may be described in the specification in general context of software, hardware elements, or program modules. The modules described above with respect to FIG. 9 may be implemented in hardware or hardware combined with software and/or firmware. For example, these modules may be implemented as computer program codes/instructions, and the computer program codes/instructions are configured to be executed in one or more processors and stored in a computer-readable storage medium. Alternatively, these modules may be implemented as hardware logic/circuits. The hardware logic/circuits may include an integrated circuit chip (which includes a processor (for example, a Central Processing Unit (CPU), a microcontroller, a microprocessor, or a Digital Signal Processor (DSP)), a memory, one or more communication interfaces, and/or one or more components in another circuit), and may optionally execute the received program codes and/or include embedded firmware to perform the functions.

Figure 10:
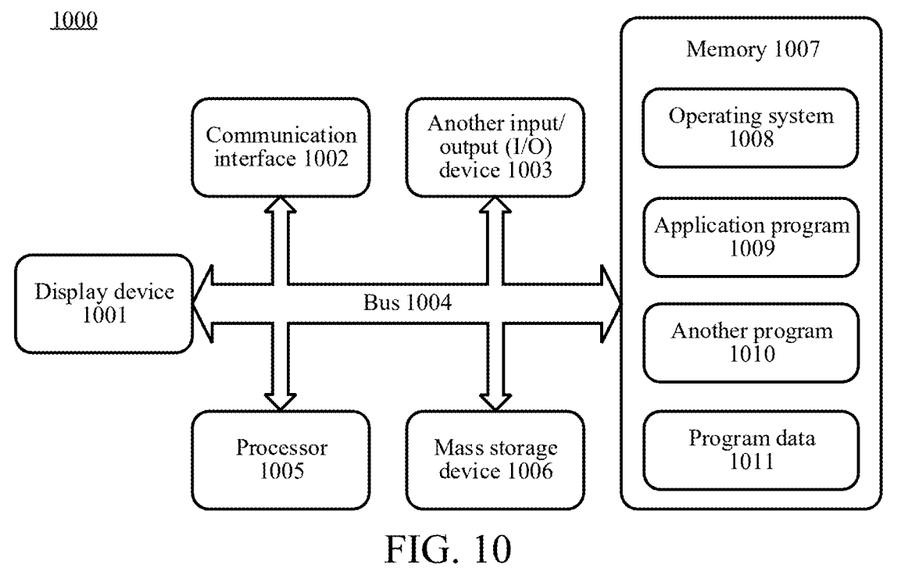
FIG. 10 is a block diagram of an exemplary computing device applicable to an exemplary example.

An example of the present application provides a computing device. FIG. 10 is a block diagram of an exemplary computing device 1000 applicable to an exemplary example.

The computing device includes: at least one processor; and at least one memory in communication connection with the at least one processor, where the at least one memory stores instructions, and the instructions, when executed by the at least one processor alone or together, cause the computing device to perform the misalignment detection method 100 for battery tabs.

An example of the present application provides a computer-readable storage medium, storing instructions, where the instructions, when executed by one or more processors of a computing device alone or together, cause the computing device to perform the misalignment detection method 100 for battery tabs.

An example of the present application provides a computer program product, including instructions, where the instructions, when executed by one or more processors of a computing device alone or together, cause the computing device to perform the misalignment detection method 100 for battery tabs.

FIG. 10 shows an example configuration of the computing device 1000 that may be used to implement the method described herein. For example, the above-mentioned misalignment detection apparatus 900 for battery tabs may be entirely or at least partially implemented by the computing device 1000 or a similar device or system.

The computing device 1000 may include at least one processor 1005, a memory 1007, (multiple) communication interfaces 1002, a display device 1001, another input/output (I/O) device 1003, and one or more mass storage devices 1006 that can communicate with each other, for example, by using a system bus 1004 or another suitable connection. The memory 1007 stores instructions, and when the instructions are executed by the processor 1005, the processor 1005 is caused to perform the method as in the above-mentioned examples.

The computing device 1000 may be various devices in different types. Examples of the computing device 1000 include, but are not limited to: a desktop computer, a server computer, a laptop or a netbook computer, a mobile device (for example, a tablet computer, a cellular or other wireless phone (for example, a smartphone), a notepad computer, or a mobile station), a wearable device (for example, glasses or a watch), an entertainment device (for example, an entertainment appliance, a set-up box coupled to a display device by communication, or a game console), a television or other display devices, an automobile computer, and the like.

The processor 1005 may be a single processing unit or multiple processing units, and all the processing units may include a single or multiple computing units or multiple cores. The processor 1005 may be implemented as one or more microprocessors, microcomputers, microcontrollers, digital signal processors, central processing units, state machines, logical circuits, and/or any devices that control, based on an operation instruction, a signal. In addition to other capabilities, the processor 1005 may be configured to obtain and execute computer-readable instructions, such as program codes of an operating system 1008, program codes of an application program 1009, and program codes of another program 1010, stored in the memory 1007, the mass storage device 1006, or another computer-readable medium.

The memory 1007 and the mass storage device 1006 are examples of the computer-readable storage medium for storing instructions. The instructions are executed by the processor 1005 to implement various functions described before. For example, the memory 1007 may generally include both a volatile memory and a non-volatile memory (such as a RAM, a ROM, and the like). In addition, the mass storage device 1006 may generally include a hard disk drive, a solid-state drive, a removable medium, an external and removable drive, a memory card, a flash memory, a floppy disk, an optical disc (such as a CD or a DVD), a storage array, a network attached storage, a storage area network, and the like. The memory 1007 and the mass storage device 1006 may be collectively referred to as a memory or a computer-readable storage medium in this specification, and may be a non-transient medium capable of storing computer-readable and processor-executable program instructions as computer program codes. The computer program codes may be executed by the processor 1005 as a specific machine configured to implement operations and functions described in the examples in this specification.

Multiple programs may be stored on the mass storage device 1006. These programs include the operating system 1008, one or more application programs 1009, the another program 1010, and program data 1011, and may be loaded to the memory 1007 for execution. Examples of such an application program or program module may include, for example, computer program logic (for example, computer program codes or instructions) used for implementing the following components/functions: the misalignment detection apparatus 900 for battery tabs (including the winding shaft control module 910 and the misalignment detection module 920), and/or another example described in this specification.

Although shown in FIG. 10 as being stored in the memory 1007 of the computing device 1000, the operating system 1008, the application program 1009, the another program 1010, and the program data 1011 or a part thereof may be implemented by using any form of the computer-readable medium that can be accessed by the computing device 1000.

The one or more communication interfaces 1002 are configured to exchange data with another device, for example, through a network or a direct connection or the like. Such a communication interface may be one or more of the following: a network interface in any type (for example, a network interface card (NIC)), a wired or wireless (such as an IEEE 802.11 wireless LAN (WLAN)) interface, a worldwide interoperation for microwave access (Wi-MAX) interface, an Ethernet interface, a universal serial bus (USB) interface, a cellular network interface, a Bluetooth™ interface, a near-field communication (NFC) interface, and the like. The communication interface 1002 may facilitate communication in multiple networks and protocol types, including a wired network (such as a LAN or a cable), a wireless network (such as a WLAN, a cellular or a satellite), the Internet, and the like. The communication interface 1002 may further provide communication with an external storage apparatus (not shown) in a storage array, a network attached storage, a storage area network or the like.

In some examples, the display device 1001 such as a monitor may be included, to display information and an image to a user. The another I/O device 1003 may be a device that receives various inputs from the user and provides various outputs for the user, and may include a touch input device, a gesture input device, a camera, a keyboard, a remote control unit, a mouse, a printer, an audio input/output device, and the like.

The technologies described in this specification may be supported by these various configurations of the computing device 1000, and are not limited to specific examples of the technologies described in this specification. For example, the functions may also be wholly or partially implemented on the "cloud" by using a distributed system. The cloud includes and/or represents a platform for resources. The platform abstracts underlying functions of hardware (for example, a server) and software resources of the cloud. The resources may include an application and/or data that can be used when computing processing is performed on a server that is far away from the computing device 1000. The resources may further include services provided by the Internet and/or a subscriber network such as a cellular or Wi-Fi network. The platform may abstract the resources and the functions to connect the computing device 1000 to another computing device. Therefore, implementation of the functions described in this specification may be distributed in the entire cloud. For example, the functions may be implemented partially on the computing device 1000 and partially by the platform that abstracts the functions of the cloud.

An example of the present application further provides a computer-readable storage medium, storing instructions thereon, where the instructions, when executed by one or more processors of a computing device alone or together, causes the computing device to perform the method as in any of the above-mentioned examples.

The computer-readable storage medium includes volatile and non-volatile media, or removable and non-removable media that are implemented by using any method or technology used to store information such as a computer-readable instruction, a data structure, a program module or other data. The computer-readable storage medium includes, but is not limited to, a RAM, a ROM, an EEPROM, a flash memory or another memory technology, a CD-ROM, a digital versatile disk (DVD) or another optical storage apparatus, a magnetic tape cartridge, a magnetic tape, a magnetic disk storage apparatus or another magnetic storage device, or any other non-transmission medium that can be used for storing information to be accessed by the computing device.

Figure 11:
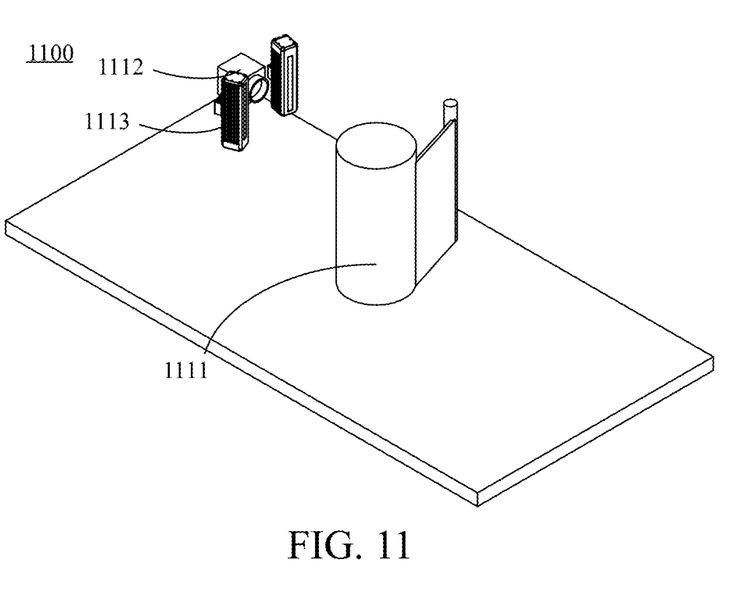
FIG. 11 is a schematic diagram of a battery electrode plate winding system according to some examples of the present application.

An example of the present application provides a battery electrode plate winding system. FIG. 11 is a schematic diagram of a battery electrode plate winding system 1100 according to some examples of the present application. Referring to FIG. 11, the battery electrode plate winding system 1100 includes: a winding machine (shown), the winding machine including a winding shaft 1111 configured to wind a battery electrode plate; a camera 1112, configured to capture an image to be tested of an electrode plate section wound on the winding shaft; and an upper machine (not shown), the upper computer being configured to perform the misalignment detection method for battery tabs according to the examples of the present disclosure.

In an example, the camera 1112 may include a line scan camera.

In an example, the battery electrode plate winding system 1100 further includes line light sources 1113, and the line light sources 1113 may be disposed on two sides of the camera 1112.

According to some examples of the present application, as shown in FIG. 1 to FIG. 8 and FIG. 11, the line scan camera may be used to capture an image toward a position of the winding shaft under irradiation of the line light source. The winding shaft includes a slot configured to remove the winding shaft from the wound electrode plate.

First, a controller controls the winding shaft to wind the battery electrode plate.

Then, the following steps are performed for an $N^{th}$ (N is an integer greater than 0) layer of an electrode plate section wound on the winding shaft:

use, in a winding period, the line scan camera to capture a plurality of continuous image rows of the layer of the electrode plate section, where each image row extends in a direction parallel to an axis of the winding shaft; and sequentially stitch the plurality of continuous image rows to obtain the image to be tested. The image to be tested includes a battery tab region.

Determine, in a direction perpendicular to the axis of the winding shaft, a distance L between an end of a battery tab and an end of the slot, in the image to be tested; and determine, according to a relative positional relationship and a layer number of the $N^{th}$ layer of the electrode plate section on the winding shaft, a misalignment amount of the battery tab when the wound electrode plate is pressed into a battery cell. Specifically, first determine an accumulated thickness $R=(D/X)*N$ from a first layer of the electrode plate section to the $N^{th}$ layer of the electrode plate section, where D is a total thickness of the wound electrode plate. X (X is an integer greater than 0, and is not less than N) is a total number of layers of the wound electrode plate. Then, determine, according to the accumulated thickness and the relative positional relationship, the misalignment amount of the battery tab in the $N^{th}$ layer of the electrode plate section when the wound electrode plate is pressed into the battery cell, where the misalignment amount $S \approx R+(L-(\pi*R)/2)=L+[(D/X)*N]*[1-(\pi/2)]$. In addition, a difference of the misalignment amount of the $N^{th}$ layer of the electrode plate section relative to the first layer of the electrode plate section may be further calculated.

Finally, it should be noted that: the above-mentioned examples are merely used for describing the technical solutions of the present application, but are not intended to limit the present application. Although the present application is described in detail with reference to the foregoing examples, it should be appreciated by a person of ordinary skill in the art that, modifications may still be made to the technical solutions described in the foregoing examples, or equivalent replacements may be made to some or all of the technical features; and these modifications or replacements will not cause the essence of corresponding technical solutions to depart from the scope of the technical solutions in the examples of the present application, and should be all included in the scope of the claims and the specification of the present application. Especially, as long as there is no structural conflict, the various technical features mentioned in each example can be combined in any way. The present application is not limited to the particular examples disclosed herein, but includes all technical solutions that fall within the scope of the claims.

What is claimed is:

1. A misalignment detection method for battery tabs, comprising:
   using a winding shaft to wind a battery electrode plate;
   for an $N^{th}$ layer of an electrode plate section wound on the winding shaft, wherein N is an integer greater than 0:
   obtaining, in a winding period, an image to be tested of the layer of the electrode plate section, wherein the image to be tested comprises a battery tab region;
   determining a relative positional relationship, between a battery tab and a reference part on the winding shaft, in the image to be tested; and
   determining, according to the relative positional relationship and a layer number of the $N^{th}$ layer of the electrode plate section on the winding shaft, a misalignment amount of the battery tab when the wound electrode plate is pressed into a battery cell, comprising: determining, according to the layer number of the $N^{th}$ layer of the electrode plate section on the winding shaft and a thickness of each layer of the electrode plate, an accumulated thickness from a first layer of the electrode plate section to the $N^{th}$ layer of the electrode plate section, wherein a sum of the following two parts is determined as the misalignment amount:
   a relative distance, between the battery tab and the reference part on the winding shaft, in the image to be tested; and
   a product of a radius of a semi-circular end region of the battery cell when the wound electrode plate is pressed into the battery cell and $(1-\pi/2)$, wherein
   $\pi$ is a circular constant, and a value of the radius is a value of the accumulated thickness.

2. The method according to claim 1, wherein obtaining, in the winding period, the image to be tested of the layer of the electrode plate section comprises:
   using, in the winding period, a line scan camera to capture a plurality of continuous image rows of the layer of the electrode plate section, wherein each image row extends in a direction parallel to an axis of the winding shaft; and
   sequentially stitching the plurality of continuous image rows to obtain the image to be tested.

3. The method according to claim 1, further comprising obtaining a total thickness and a total number of layers of the wound electrode plate, and determining, according to the relative positional relationship and the layer number of the $N^{th}$ layer of the electrode plate section on the winding shaft, the misalignment amount of the battery tab when the wound electrode plate is pressed into a battery cell comprises:

determining, according to the total thickness and the total number of layers, the accumulated thickness from the first layer of the electrode plate section to the $N^{th}$ layer of the electrode plate section; and determining, according to the accumulated thickness and the relative positional relationship, the misalignment amount of the battery tab in the $N^{th}$ layer of the electrode plate section when the wound electrode plate is pressed into the battery cell.

4. The method according to claim 1, wherein the winding shaft comprises a slot configured to remove the winding shaft from the wound electrode plate, and the reference part is a position of the slot.

5. The method according to claim 4, wherein determining the relative positional relationship, between the battery tab and the reference part on the winding shaft, in the image to be tested comprises:

determining, in a direction perpendicular to the axis of the winding shaft, a distance, between an end of the battery tab and an end of the slot, in the image to be tested and using the distance as the relative positional relationship.

6. The method according to claim 1, wherein determining the relative positional relationship, between the battery tab and a reference part on the winding shaft, in the image to be tested comprises:

respectively determining, based on pixel values of a plurality of pixels comprised in the image to be tested, a position of the battery tab and a position of the reference part from the image to be tested; and determining, according to the position of the battery tab and the position of the reference part, the relative positional relationship.

7. The method according to claim 1, wherein the winding shaft is configured to wind, according to a control instruction, the battery electrode plate, and the layer number of the $N^{th}$ layer of the electrode plate section on the winding shaft is determined through the following process:

determining an accumulated rotation angle of the winding shaft; and determining, according to the accumulated rotation angle, the layer number of the $N^{th}$ layer of the electrode plate section on the winding shaft, comprising: for every 360-degree rotation, determining that the layer number of the electrode plate section is increased by one.

8. A misalignment detection apparatus for battery tabs, comprising:

a winding shaft control module, configured to control a winding shaft to wind a battery electrode plate; and a misalignment detection module, the misalignment detection module comprising an image obtaining unit, a position determining unit, and a misalignment amount determining unit, for an $N^{th}$ layer of an electrode plate section wound on the winding shaft, wherein N is an integer greater than 0:

the image obtaining unit being configured to obtain, in a winding period, an image to be tested of the layer of the electrode plate section, wherein the image to be tested comprises a battery tab region;

the position determining unit being configured to determine a relative positional relationship, between a battery tab and a reference part on the winding shaft, in the image to be tested; and the misalignment amount determining unit being configured to determine, according to the relative positional relationship and a layer number of the $N^{th}$ layer of the electrode plate section on the winding shaft, a misalignment amount of the battery tab when the wound electrode plate is pressed into a battery cell, comprising: determining, according to the layer number of the $N^{th}$ layer of the electrode plate section on the winding shaft and a thickness of each layer of the electrode plate, an accumulated thickness from a first layer of the electrode plate section to the $N^{th}$ layer of the electrode plate section, wherein a sum of the following two parts is determined as the misalignment amount:

a relative distance, between the battery tab and the reference part on the winding shaft, in the image to be tested; and a product of a radius of a semi-circular end region of the battery cell when the wound electrode plate is pressed into the battery cell and $(1-\pi/2)$, wherein $\pi$ is a circular constant, and a value of the radius is a value of the accumulated thickness.

9. A battery electrode plate winding system, comprising:

a winding machine, the winding machine comprising a winding shaft configured to wind a battery electrode plate;

a camera, configured to capture an image to be tested of an electrode plate section wound on the winding shaft; and an upper computer, the upper computer being configured to perform the method according to claim 1.

* * * * *